US006874335B2

(12) United States Patent
Uhlenbrock

(10) Patent No.: US 6,874,335 B2
(45) Date of Patent: Apr. 5, 2005

(54) LARGE SCALE SYNTHESIS OF GERMANIUM SELENIDE GLASS AND GERMANIUM SELENIDE GLASS COMPOUNDS

(75) Inventor: Stefan Uhlenbrock, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 289 days.

(21) Appl. No.: 10/123,050

(22) Filed: Apr. 12, 2002

(65) Prior Publication Data

US 2003/0192350 A1 Oct. 16, 2003

(51) Int. Cl.[7] .............................. C03B 5/24; C03C 3/32

(52) U.S. Cl. ........................... 65/29.19; 65/29.1; 65/34; 65/134.2; 65/135.2; 65/137; 65/DIG. 15; 423/89; 423/508; 423/509

(58) Field of Search .............................. 65/29.1, 29.12, 65/29.19, 29.21, 34, 35, 83, 85, 121, 134.2, 135.2, 137, 157, 162, 178, 335, DIG. 15; 385/141–144; 501/40–42; 423/508–510, 89, 92, 93

(56) References Cited

U.S. PATENT DOCUMENTS

| | | | | | |
|---|---|---|---|---|---|
| 4,214,249 A | * | 7/1980 | Kasai et al. | ............. | 346/135.1 |
| 4,704,371 A | * | 11/1987 | Krolla et al. | ................. | 501/40 |
| 4,708,942 A | * | 11/1987 | Nishiii et al. | ................. | 501/40 |
| 4,890,182 A | * | 12/1989 | Sweet | ......................... | 361/56 |
| 5,761,115 A | | 6/1998 | Kozicki et al. | ............. | 365/182 |
| 5,846,889 A | * | 12/1998 | Harbison et al. | ............. | 501/40 |
| 6,015,765 A | * | 1/2000 | Harbison et al. | ............. | 501/40 |
| 6,128,429 A | * | 10/2000 | Cole et al. | .................. | 385/142 |
| 6,634,189 B1 | * | 10/2003 | Hudgens et al. | .............. | 65/389 |
| 6,635,914 B2 | * | 10/2003 | Kozicki et al. | ............. | 257/296 |

FOREIGN PATENT DOCUMENTS

| | | | | | |
|---|---|---|---|---|---|
| JP | 06-183779 | * | 7/1994 | ............. | C03C/4/10 |
| WO | PCT/US01/28266 | | 3/2002 | ............ | H01C/7/00 |

OTHER PUBLICATIONS

CRC Handbook of Chemistry and Physics, 84$^{th}$ Edition, 2003–2004, p. 6–105.*

* cited by examiner

*Primary Examiner*—Peter Chin
*Assistant Examiner*—Eric Hug
(74) *Attorney, Agent, or Firm*—Dickstein Shapiro Morin & Oshinsky LLP

(57) ABSTRACT

Systems and methods for large scale synthesis of germanium selenide glass and germanium selenide glass compounds are provided. Up to about 750 grams of a germanium selenide glass or a glass compound can be synthesized at a time in about eight hours or less. Stoichiometrically proportional amounts of germanium and selenium are placed in an ampoule. A variable may also be placed in the ampoule. The ampoule is heated to above the softening temperature of the glass or glass compound being synthesized. The ampoule is then rocked for a period of time while the temperature is held constant. The temperature of the ampoule is then brought down to above the softening temperature of the glass or glass compound being synthesized and then quenched.

70 Claims, 10 Drawing Sheets

Place germanium and selenium (and variable) in a clean ampoule and subject to vacuum 102
Seal ampoule 104
Place sealed ampoule in a heating device 106
Increase temperature to ≥ $T_{softening}$ of glass (or system) being synthesized 108
Hold temperature and rock ampoule 110
Lower temperature to $T_{softening}$ of glass (or system) being synthesized (if necessary) 112
Quench 114
Hold ampoule at quench temperature to ensure complete and homogenous cooling 116

LARGE SCALE SYNTHESIS OF GERMANIUM SELENIDE GLASS AND GERMANIUM SELENIDE GLASS COMPOUNDS

BACKGROUND OF THE INVENTION

This invention relates to systems and methods for synthesizing germanium selenide glass and germanium selenide glass compounds. More particularly, this invention relates to systems and methods for large scale synthesis of germanium selenide glass and germanium selenide glass compounds in reduced time.

As used herein, a germanium selenide glass compound includes germanium, selenium, and a variable (e.g., a dopant).

Germanium selenide glass is widely used in the fabrication of semiconductor devices. However, in a known technique for producing $Ge_3Se_7$, which is one type of germanium selenide glass, only about ten grams of that glass can be produced at one time. Moreover, this technique requires about 50 hours in order to produce those ten grams of germanium selenide glass.

The known technique involves placing stoichiometric proportions of germanium and selenium (totaling no more than about ten grams) in an ampoule at atmospheric pressure (i.e., at about 1 atm.). An ampoule is a small, hermetically sealed quartz-glass vessel that is typically used to hold chemical solutions or materials. A vacuum is established in the ampoule, which is then flame sealed to seal the contents under vacuum. The ampoule is placed in a furnace and heated to about 300° C. and typically left at this temperature overnight. The next morning, the ampoule is heated to about 750° C. at a rate of about 0.5° C./minute. The ampoule is left at this temperature until the following morning to ensure that the germanium has melted and that the selenium has reacted with the germanium. If the melting and reaction do not occur, the selenium can exhibit a vapor pressure of about 10 atm. at about 900° C., which may burst the ampoule. The following morning, the temperature of the ampoule is increased to about 940° C. at a rate of about 0.5° C./minute. This ensures that the contents of the ampoule have melted. Once the temperature reaches about 940° C., the ampoule is rocked back and forth (typically by a rocking mechanism connected to the furnace) for at least about six hours. During rocking, the ampoule is allowed to cool down to a range of about 800° C. to about 780° C. After the ampoule has cooled down, it is quenched in a cooling bath of ice water. The ampoule is then cracked to retrieve the germanium selenide glass.

The only known way to scale-up the synthesis of this germanium selenide glass using this known technique is to run multiple small scale reactions concurrently, in which each reaction produces only about ten grams of glass per 50 hours. Clearly, this technique is very time consuming and impractical for large scale production.

Germanium selenide glass is particularly used in the fabrication of semiconductor devices, such as, for example, PCRAM (programmable cell random access memory). In the fabrication of known PCRAM devices, a thin layer of a conductive material (e.g., silver) is deposited over a germanium selenide glass substrate. The conductive material is typically irradiated with electromagnetic energy resulting in a doped or photodoped substrate (i.e., a germanium selenide glass compound). If care is not taken while irradiating the conductive material, such an irradiation may unpredictably change the properties of the substrate as well as result in an unpredictable amount of doping. Such changes or unpredictable amounts of doping may unpredictably, and usually undesirably, alter the electrical and performance characteristics of the PCRAM device being fabricated.

Moreover, similar to the synthesis of germanium glass, there is no known technique for synthesizing germanium selenide glass compounds on a large scale.

In view of the foregoing, it would be desirable to be able to synthesize more than ten grams of a germanium selenide glass or a germanium selenide glass compound in one reaction.

It would also be desirable to be able to synthesize a germanium selenide glass or a germanium selenide glass compound in one reaction in less than about 50 hours.

It would further be desirable to be able to synthesize a germanium selenide glass compound having substantially known properties and a substantially known amount of doping.

SUMMARY OF THE INVENTION

It is an object of the invention to synthesize more than ten grams of a germanium selenide glass or a germanium selenide glass compound in one reaction.

It is also an object of the invention to synthesize a germanium selenide glass or a germanium selenide glass compound in one reaction in less than about 50 hours.

It is further an object of the invention to synthesize a germanium selenide glass compound having substantially known properties and a substantially known amount of doping.

In accordance with the invention, large scale synthesis of germanium selenide glass of many different stoichiometries is provided. Moreover, the invention can synthesize these different types of glass in about eight hours or less. The amount of glass that can be synthesized is scalable. That is, germanium selenide glass weighing up to about 750 grams can be made at one time in one reaction. The invention synthesizes glass composed of about 15% to about 42% germanium.

Also in accordance with the invention, germanium selenide glass can be predictably doped with a variable. Such glass compounds may include a variable such as lithium, vanadium, chromium, manganese, cobalt, molybdenum, ruthenium, silver, praseodymium, neodymium, iridium, gold, and lead. Other suitable variables can be alternatively used. The variable included in such glass compounds can be in elemental form (e.g., pure lithium) or in compound form (e.g., silver selenide). Known amounts of the variable react with known amounts of germanium and selenium.

In one embodiment of the invention, a quartz-glass ampoule is preferably first cleaned using HCl or $HCl/HNO_3$. The ampoule is then dried inside a dry box. For pure germanium selenide glass, 99.999% germanium and 99.999% selenium are placed in the ampoule while the ampoule is still inside the dry box. The selenium is preferably placed inside the ampoule away from the opening to prevent the selenium from subliming when the ampoule is sealed (a flame torch is preferably used to seal the opening of the ampoule). Any volatile variable placed in the ampoule should also be placed away from the opening to prevent the variable from subliming when the ampoule is sealed. The contents of the ampoule are subjected to a vacuum, and the ampoule is sealed such that the contents inside the ampoule remain under vacuum.

The sealed ampoule is placed in a furnace or other heating device, and heated to the softening temperature of the glass being synthesized or preferably higher. The softening temperature is the glass transition temperature. The ampoule is then rocked to ensure that the germanium and selenium completely mix. Rocking time depends on the amount of glass being synthesized (e.g., for about 450 grams of germanium and selenium, about 5 to 6 hours of rocking is sufficient). After thorough mixing, the composition is then cooled to between the softening temperature of the glass being synthesized and 20° C. higher than the softening temperature (i.e., no lower than the softening temperature). After cooling (which may not be necessary if heated to no more than 20° C. above the softening temperature), the ampoule is quenched in ice water. For a synthesis of about 400 grams of germanium and selenium, the reaction takes about eight hours. Thus, with one set of apparatus, about three reactions per day are possible. Therefore, one or more kilograms of germanium selenide glass can be produced per day with one apparatus.

For a germanium selenide glass doped with a variable, the germanium, selenium, and variable are similarly placed in an ampoule while inside a dry box. The contents of the ampoule are subjected to a vacuum, and the ampoule is sealed such that the contents remain under vacuum. After placing the sealed ampoule in a furnace or other heating device, the ampoule is heated. Once the ampoule is heated to at least the softening temperature of the compound being synthesized, the ampoule is rocked to ensure that the variable is evenly distributed. The compound is cooled to a range of about the softening temperature of the compound to about 20° C. above the softening temperature, if the compound is not already within that range. After cooling (if necessary), the compound is quenched.

More generally in accordance with the invention, germanium and selenium (and a variable if desired) can be placed in any appropriate container. The contents of the container are then subjected to a vacuum, and the container is sealed such that the contents inside the container remain under vacuum. The contents are then heated to the softening temperature of the glass or glass compound being synthesized, mixed, cooled, and quenched using any suitable means.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention can preferably produce upwards of about 750 grams of germanium selenide glass per reaction depending on the stoichiometry of the glass being synthesized. For a synthesis of about 400 grams, the reaction takes about eight hours. For a 30 gram synthesis of a germanium-selenium-manganese compound ($Ge_{25}Se_{75}$; 3% atomic weight of manganese), the reaction takes about six hours. The invention also produces upwards of about 750 grams of a germanium selenide glass compound depending on the variable chosen and the ratios of the germanium and selenium to each other and to the variable. The initial cleaning of the equipment, which is important, is not included in the reaction times.

Suitable variables for germanium selenide glass compounds in accordance with the invention include lithium, vanadium, chromium, manganese, cobalt, molybdenum, ruthenium, silver, praseodymium, neodymium, iridium, gold, and lead. Other suitable variables may also be used. The variable included in such glass compounds can be in elemental form (e.g., pure lithium) or in compound form (e.g., silver selenide). Known amounts of the variable are reacted with known amounts of germanium and selenium.

Figure 1:
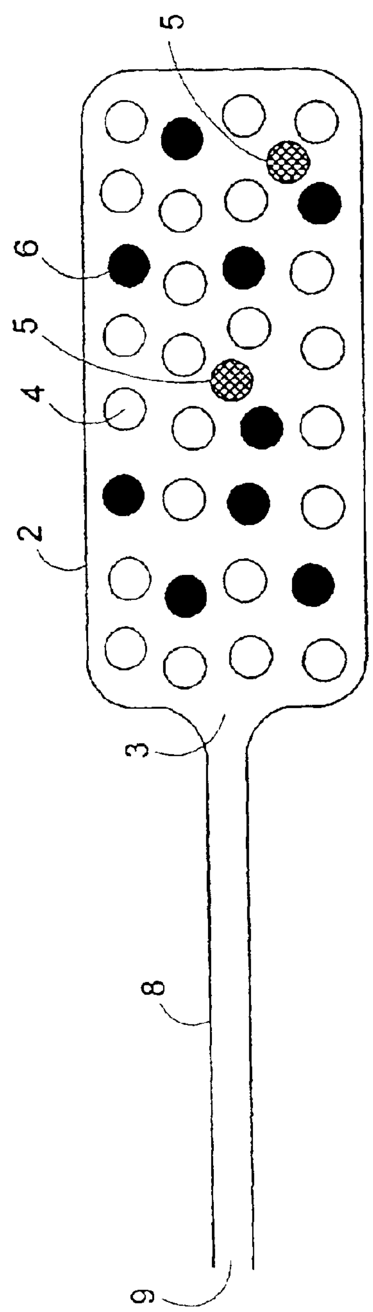
FIG. 1 illustrates an ampoule containing germanium, selenium, and a variable.

FIG. 1 shows a preferably quartz-glass ampoule 2 connected to a preferably quartz-glass tube 8 at opening 3. Ampoule 2 and tube 8 may be made of other suitable material or materials besides quartz-glass. Ampoule 2 and tube 8 are preferably cleaned with a cleaning agent such as HCl or $HCl/HNO_3$. Ampoule 2 and tube 8 are then heated for about twenty-four hours in a furnace of about 120° C. Ampoule 2 and tube 8 are preferably further cleaned by refilling ampoule 2 and tube 8 with a dry inert gas such as Ar or $N_2$ and then subjecting them to a vacuum. Ampoule 2 and tube 8 may be refilled with a dry inert gas and subjected to a vacuum several more times to further ensure cleanliness.

The cleanliness of ampoule 2 and tube 8 and the purity of the germanium, selenium, and the variable (if present) is important in order to preserve the integrity of the mean coordination in the backbone structure of the glass.

After ampoule 2 and tube 8 are cleaned, 99.999% pure germanium 4 and 99.999% pure selenium 6 are placed in ampoule 2 through tube 8 via openings 3 and 9. A variable 5 may also be placed in ampoule 2. Germanium 4, selenium 6, and variable 5 are preferably in the form of solid pellets. Germanium 4 and selenium 6 may be obtained in this form from Cerac, Inc., of Milwaukee, Wis. Alternatively, germanium 4, selenium 6, and variable 5 may be in liquid form.

The amounts of germanium 4, selenium 6, and variable 5 placed in ampoule 2 preferably fill most of ampoule 2. This decreases the amount of selenium, germanium, or variable that may evaporate or sublime out of the liquid or solid phase, respectively. Such evaporation or sublimation may cause the glass or compound to synthesize with other than the desired stoichiometric proportions. However, the amounts of germanium 4, selenium 6, and variable 5 placed in ampoule 2 should not fill the entire volume of ampoule 2 in order to allow the germanium 4, selenium 6, and variable 5 to thoroughly mix inside ampoule 2. For example, in an ampoule 20 cm. long and 4.6 cm. in diameter, about 50 grams of germanium, about 218 grams of selenium, and about 8 grams of manganese are acceptable amounts. For this ampoule, tube 8 can be, for example, 15 cm. long and 1.3 cm. in diameter.

Germanium 4, selenium 6, and variable 5 (if desired) are preferably placed in ampoule 2 inside a dry box (not shown). Selenium 6 and any variable that is volatile (e.g., susceptible to sublimation) are preferably placed in ampoule 2 at the end opposite opening 3. This placement makes those variable materials (including selenium) less likely to sublime when ampoule 2 is sealed (ampoule 2 is preferably sealed with a flame torch—described below).

An adapter (not shown) for connection to a commercially available vacuum line (not shown) is preferably fitted to ampoule 2 inside the dry box. The adapter preferably has a valve or switch such that the adapter and in turn, opening 9 of tube 8 may be selectively opened and closed. The adapter and ampoule 2 are taken out of the dry box and connected to the vacuum line. The contents of ampoule 2 are then subjected to a vacuum. To ensure cleanliness, the adapter is closed before the adapter and ampoule 2 are taken out of the dry box. The adapter remains closed until it is ready to be connected to the vacuum line. This will ensure that air does not enter tube 8 or ampoule 2 and interact with germanium 4, selenium 6, and variable 5 (if present).

Ampoule 2 is preferably sealed while its contents are still subjected to the vacuum. Germanium 4, selenium 6, and variable 5 are preferably at room temperature (about 25° C.) when they are sealed in ampoule 2. Alternatively, germanium 4, selenium 6, or variable 5 may be at a temperature other than room temperature when they are sealed in ampoule 2.

However, at lower temperatures, the quantity of each material placed in ampoule 2 can be measured with more preciseness. For example, germanium 4, selenium 6, variable 5 or any combination of them may be chilled, for example, by refrigeration to a temperature below room temperature. Advantageously, less germanium 4 and selenium 6 may sublime out of the solid phase. Some germanium 4 and selenium 6 may sublime when they are subjected to a vacuum or when ampoule 2 is sealed with a heat source (described below). Unless accounted for, such a sublimation may be detrimental because the synthesized glass or compound may have a stoichiometry different than the desired stoichiometry.

If germanium 4, selenium 6, and variable 5 are at a temperature higher than room temperature, less heating and mixing time is required. For example, if germanium 4, selenium 6, and manganese were all in liquid form when they are placed in ampoule 2, only about 3 hours of heating and mixing should be required for a 450 gram synthesis.

A suitable heat source such as an $H_2/O_2$ torch can be used to seal ampoule 2 by melting a portion of tube 8 about 1 cm away from opening 3. This causes the rest of tube 8 to break off from ampoule 2. Note that portion 10 of tube 8 in FIG. 2 was melted to seal opening 3 of ampoule 2.

Figure 2:
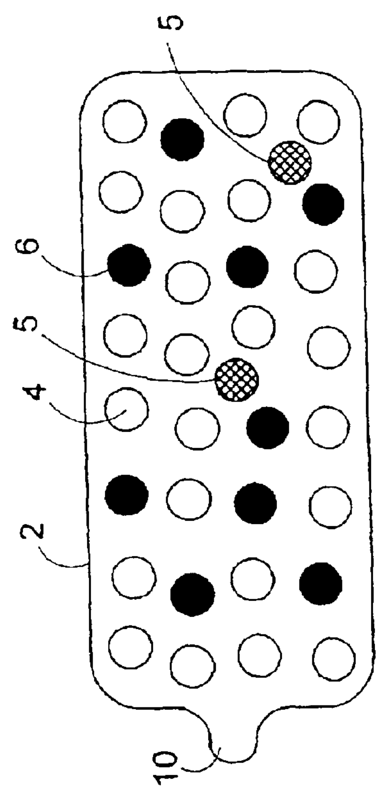
FIG. 2 illustrates the ampoule of FIG. 1 sealed with the contents under vacuum.

FIG. 2 shows germanium 4, selenium 6, and variable 5 sealed under vacuum. The appropriate stoichiometric proportions of 99.999% pure germanium 4, 99.999% pure selenium 6, and variable 5 required to synthesize the selected compound are sealed inside. If a pure germanium selenide glass were being synthesized, the appropriate stoichiometric proportions of germanium 4 and selenium 6 would be sealed inside. The amount of germanium 4, selenium 6, and variable 5 shown in ampoule 2 is merely illustrative.

Figure 3:
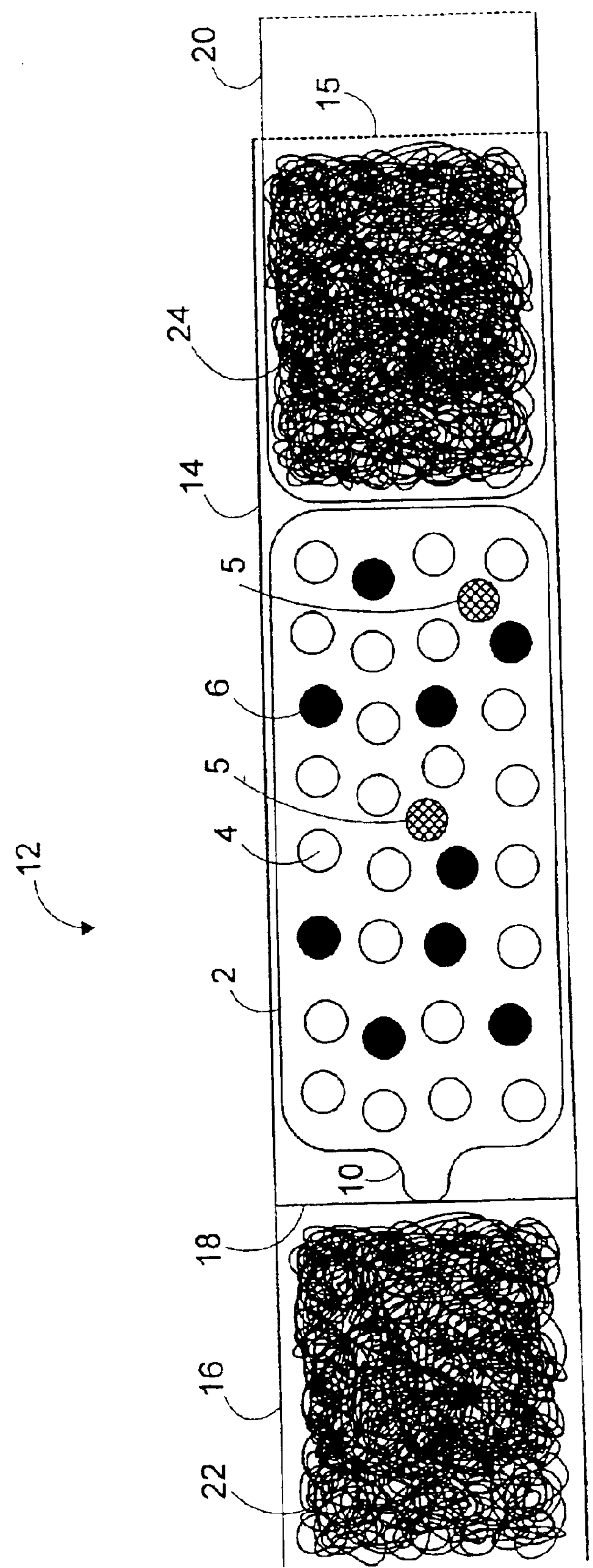
FIG. 3 is a cross-sectional view of an assembly of an ampoule and tubes in accordance with the invention.

After ampoule 2 is sealed, it is placed in an assembly such that the contents of ampoule 2 (i.e., the germanium 4, selenium 6, and variable 5) can be homogeneously heated in a furnace or other heating device. FIG. 3 shows a cross-sectional view of such an assembly. Assembly 12 includes tube 14 and extension tube 16. Tube 14 and extension tube 16 may be made of quartz-glass or other comparable material or materials. Tube 14 and tube 16 preferably have the same outer diameter and are also preferably connected. Tube 14 is preferably sealed at the end connected to tube 16 by seal 18. Seal 18 is preferably made of quartz-glass or other suitable material or materials that can prevent ampoule 2 from sliding further inward. Tube 16 and seal 18 keep ampoule 2 positioned in the homogeneous heating zone of a furnace or other heating device. An alternative to seal 18 is having tube 16 with a closed end. Ampoule 2 is then in contact with the closed end of tube 16. As a second alternative, tube 14 may have a closed end. In both cases, tube 14 and tube 16 do not need to be connected and seal 18 is unnecessary. Tube 16 will be in contact with the closed end of tube 14 which will be in contact with ampoule 2.

The opposite end of tube 14 preferably has opening 15 to allow ampoule 2 to be placed in, and taken out of, assembly 12. The inner diameter of tube 14 is preferably slightly larger than the outer diameter of ampoule 2. Tube 14 is preferably long enough such that a portion of tube 14 extends outside the furnace when assembly 12 is placed in the furnace.

After ampoule 2 is placed inside tube 14 of assembly 12, a portion of a tube 20 having an outer diameter preferably slightly smaller than the inner diameter of tube 14 is slid into tube 14. Tube 20 is preferably slid into tube 14 such that the end of ampoule 2 with tube portion 10 is in contact with seal 18, and the opposite end of ampoule 2 is in contact with tube 20. Tube 20 is preferably long enough such that when tube 20 is in contact with an end of ampoule 2 and tube portion 10 is in contact with seal 18, a portion of tube 20 extends outside the furnace beyond tube 14.

Preferably, quartz wool 22 and 24 are placed inside tube 16 and tube 20, respectively, to help ensure that all of ampoule 2 is heated to substantially the same temperature. Furthermore, quartz wool 24 helps insulate ampoule 2 from any cool air that may enter via tube 20.

After assembly 12 is complete (i.e., ampoule 2 and tube 20 are slid inside of tube 14 such that the end of tube 20 is in contact with an end of ampoule 2 and tube portion 10 is in contact with seal 18), assembly 12 is placed inside a tube furnace. Alternatively, tubes 14 and 16 with ampoule 2 inside may be first placed inside the furnace and then tube 20 slid inside tube 14. Or, tubes 14 and 16 may be placed first in the furnace and then ampoule 2 and tube 20 slid inside tube 14.

Figure 4:
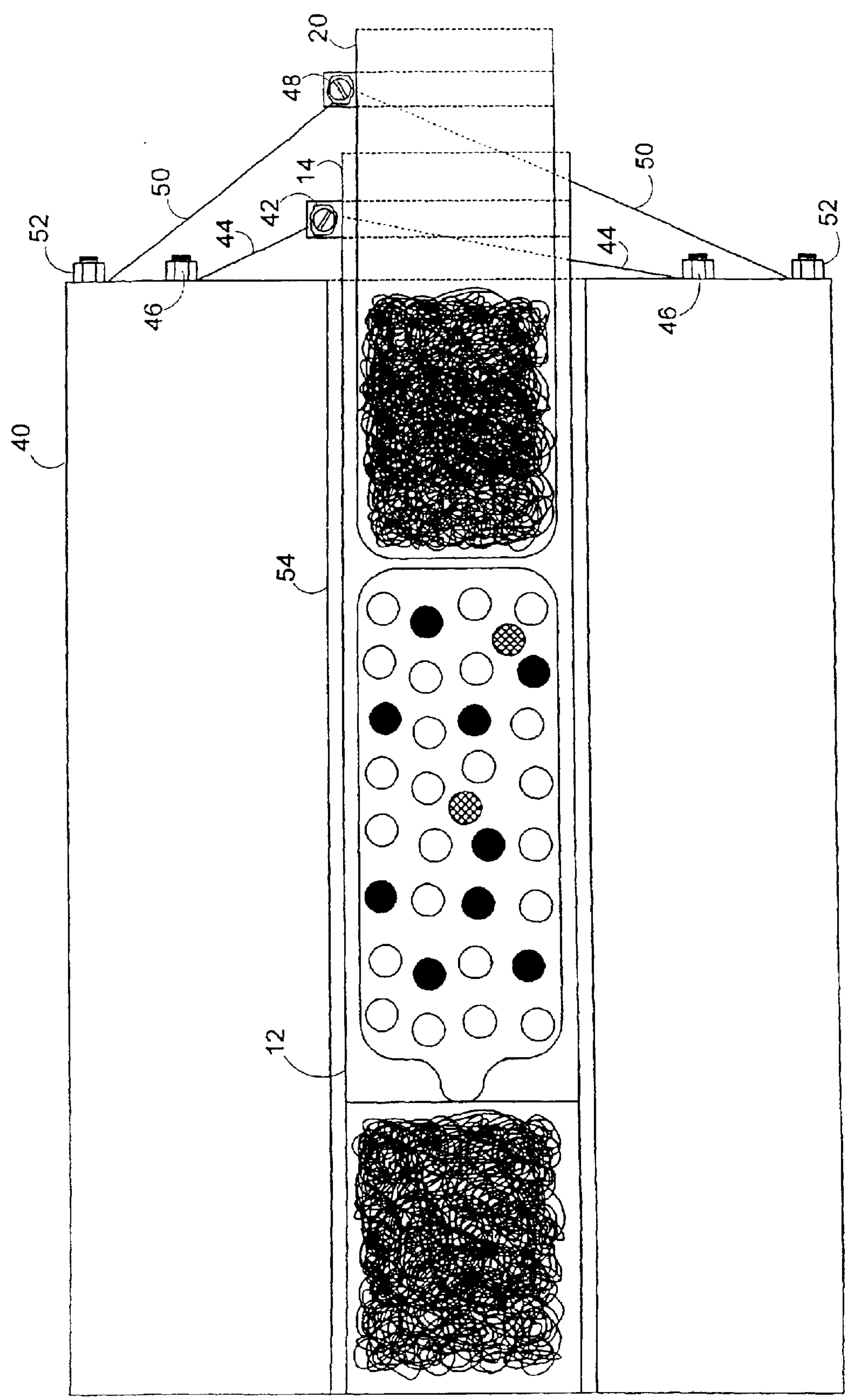
FIG. 4 is a cross-sectional view of a multi-position tube furnace in which the assembly of FIG. 3 is placed in accordance with the invention.

FIG. 4 shows a cross-sectional view of tube furnace 40 in accordance with the invention. Alternatively, furnace 40 can be other types of heating devices that can heat ampoule 2 while the contents of ampoule 2 are motionless or in motion. Preferably, furnace 40 is a multi-position tube furnace such as an EW-33903-10 by Cole-Parmer of Vernon Hills, Ill. When such a tube furnace is motionless, an ampoule placed inside the furnace (e.g., as part of assembly 12) can be heated without the contents of the ampoule or the ampoule itself moving. Preferably, such a tube furnace includes a rocking device or other mechanism that can move the tube furnace rhythmically (e.g., from a starting point to an intermediary point and back to the starting point). Note that rhythmic movement is not required. Any movement of the furnace that causes the contents inside the ampoule to completely mix is sufficient.

Furnace 40 preferably includes a hose clamp 42 clamped to the portion of the outer surface of tube 14 that extends outward from furnace 40. Wires 44 are preferably connected to hose clamp 42 and to screws 46. Wires 44 may be wrapped around screws 46 or wires 44 may be pinned between screws 46 and the outer surface of the face of furnace 40. Screws 46 are preferably diametrically opposed on the outer surface of the face of furnace 40. This arrangement secures tube 14 (and tube 16) inside tube furnace 40.

Furnace 40 also preferably includes a hose clamp 48 clamped to the portion of the outer surface of tube 20 that extends beyond tube 14. Wires 50 are preferably connected to hose clamp 48 and to screws 52. Wires 50 may be wrapped around or screws 52 or pinned between screws 52 and the outer surface of the face of furnace 40. Screws 52 are preferably diametrically opposed on the outer surface of the face of furnace 40. This arrangement secures tube 20 and prevents ampoule 2 from moving along the longitudinal axis of assembly 12.

Hose clamps 42 and 48 may alternatively be clamped onto tubes 14 and 20, respectively, before tubes 14 and 20 are placed in furnace 40.

Tubes 14 and 20 are secured inside furnace 40 such that neither tube (nor ampoule 2) can move, or can only move very little, along the longitudinal axis of furnace 40 when furnace 40 is in motion.

The outer diameter of tube 14 is preferably slightly smaller than the inner diameter of tube 54 of furnace 40 such that tube 14 does not shake around, or only shakes very little, inside furnace 40 when 30 furnace 40 is in motion. For example, if the inner diameter of tube 54 is about 5 cm, the outer diameter of tube 14 can be about 4.6 cm.

Similarly, the outer diameters of ampoule 2 and tube 20 are preferably slightly smaller than the inner diameter of tube 14 such that ampoule 2 and tube 20 do not shake around, or only shake very little, inside tube 14 when furnace 40 is in motion.

Figure 5:
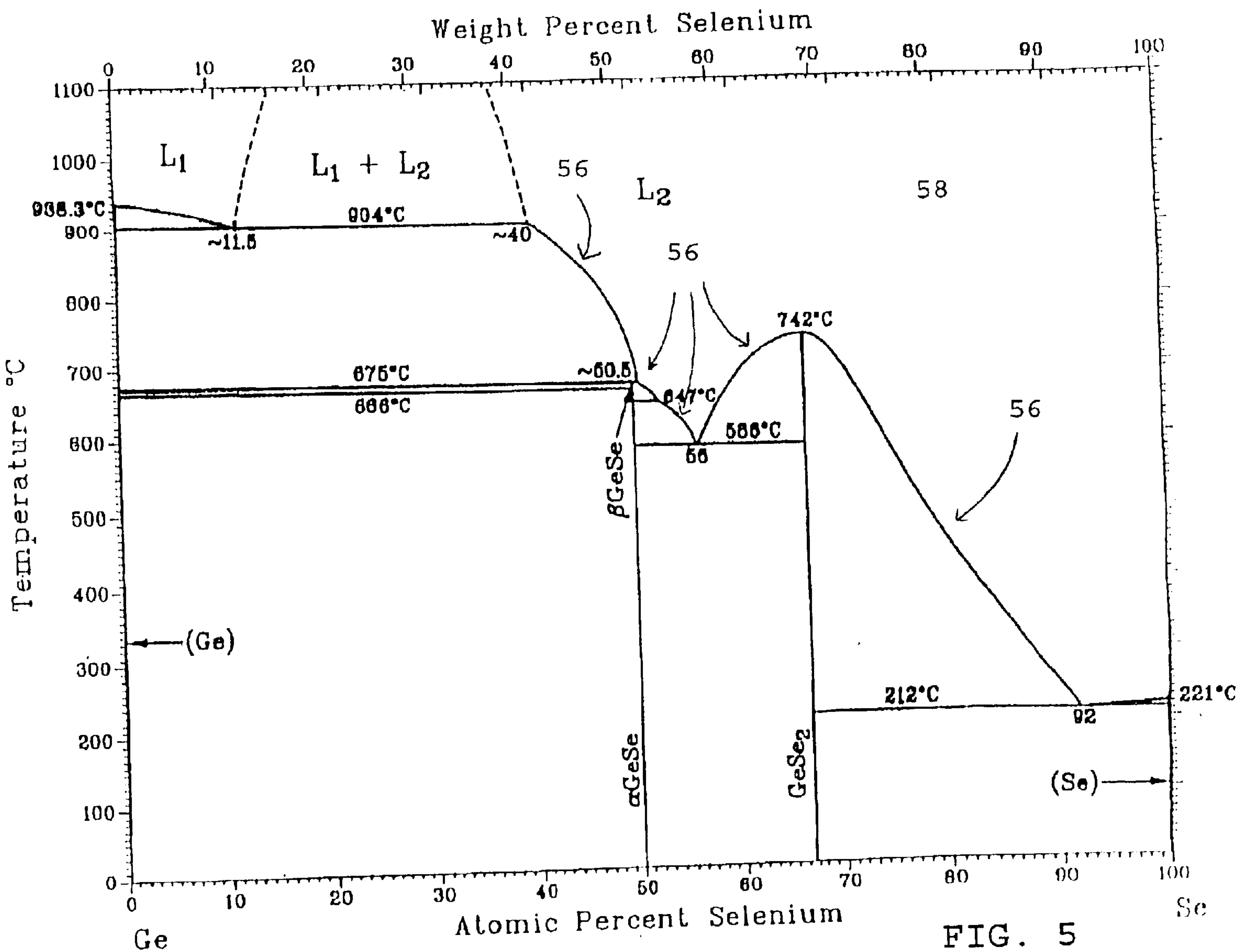
FIG. 5 is a germanium-selenium phase diagram.

After ampoule 2 and assembly 12 are secure inside furnace 40, ampoule 2 is heated. The temperature inside furnace 40 is increased to at least the softening temperature of the glass or compound being synthesized and preferably higher. The temperature is typically increased to between about 400° C. and 800° C. and preferably no higher than about 850° C. A germanium-selenium phase diagram is shown in FIG. 5. The melting temperatures of germanium selenide glass with different stoichiometries are roughly indicated by transition lines 56. The melting temperature is no higher than the temperature at which the glass being synthesized changes to $L_2$ phase 58. If a small amount of a variable is involved in a germanium selenide compound, the germanium-selenium phase diagram may be used as a rough guideline to determine the softening temperature of that compound. As is known in the art, the softening temperature of a germanium-selenium compound is approximately half the melting temperature of that compound. For example, for 12% Ge/88% Se, the glass transition temperature (i.e., the softening temperature) is about 107° C.; for 24% Ge/76% Se, the glass transition temperature is about 229° C.; for 30% Ge/70% Se, the glass transition temperature is about 335° C.; for 40% Ge/60% Se, the glass transition temperature is about 347° C.

The temperature inside furnace 40 is preferably increased at a rate ranging from about 20° C./minute to about 30° C./minute. If the temperature inside furnace 40 is raised too fast, a substantial amount of selenium 6 may not react with germanium 4 or the other variable. The unreacted selenium 6 may then exhibit a vapor pressure strong enough to burst the ampoule. Care also should be exercised when increasing the temperature in a germanium selenide glass compound reaction involving a variable that exhibits a large vapor pressure.

After the temperature inside furnace 40 has reached or exceeded the softening temperature of the glass or glass compound being synthesized, the temperature is held constant and furnace 40 is preferably rocked or moved to mix the contents of ampoule 2 into a homogenous molten mixture. The temperature may be held constant at, for example, no lower than 400° C. For a synthesis of about 400 grams of germanium selenide glass, furnace 40 should be rocked or moved for about five to six hours to ensure that all of germanium 4 and selenium 6 completely mix. For a synthesis of about 750 grams, about 8 hours of rocking should be sufficient to allow all of germanium 4 and selenium 6 to mix. Generally, the larger the synthesis, the more time is necessary to allow germanium 4 and selenium 6 to react. Similarly, for larger syntheses of glass compounds, more time is necessary to allow germanium 4, selenium 6, and variable 5 to react.

Figure 6:
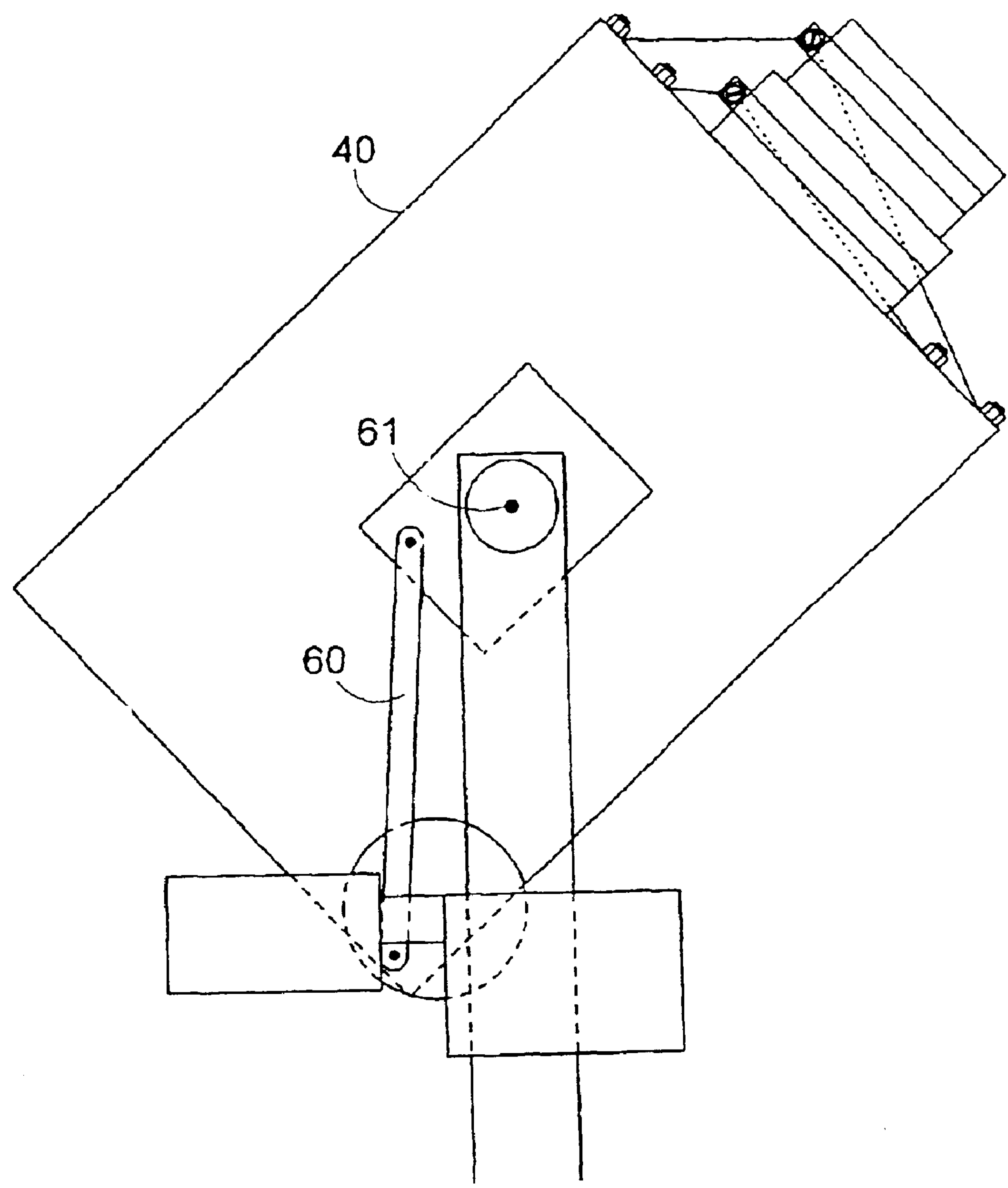
FIGS. 6 and 7 illustrate the rocking of the tube furnace of FIG. 4 in accordance with the invention.
Figure 7:
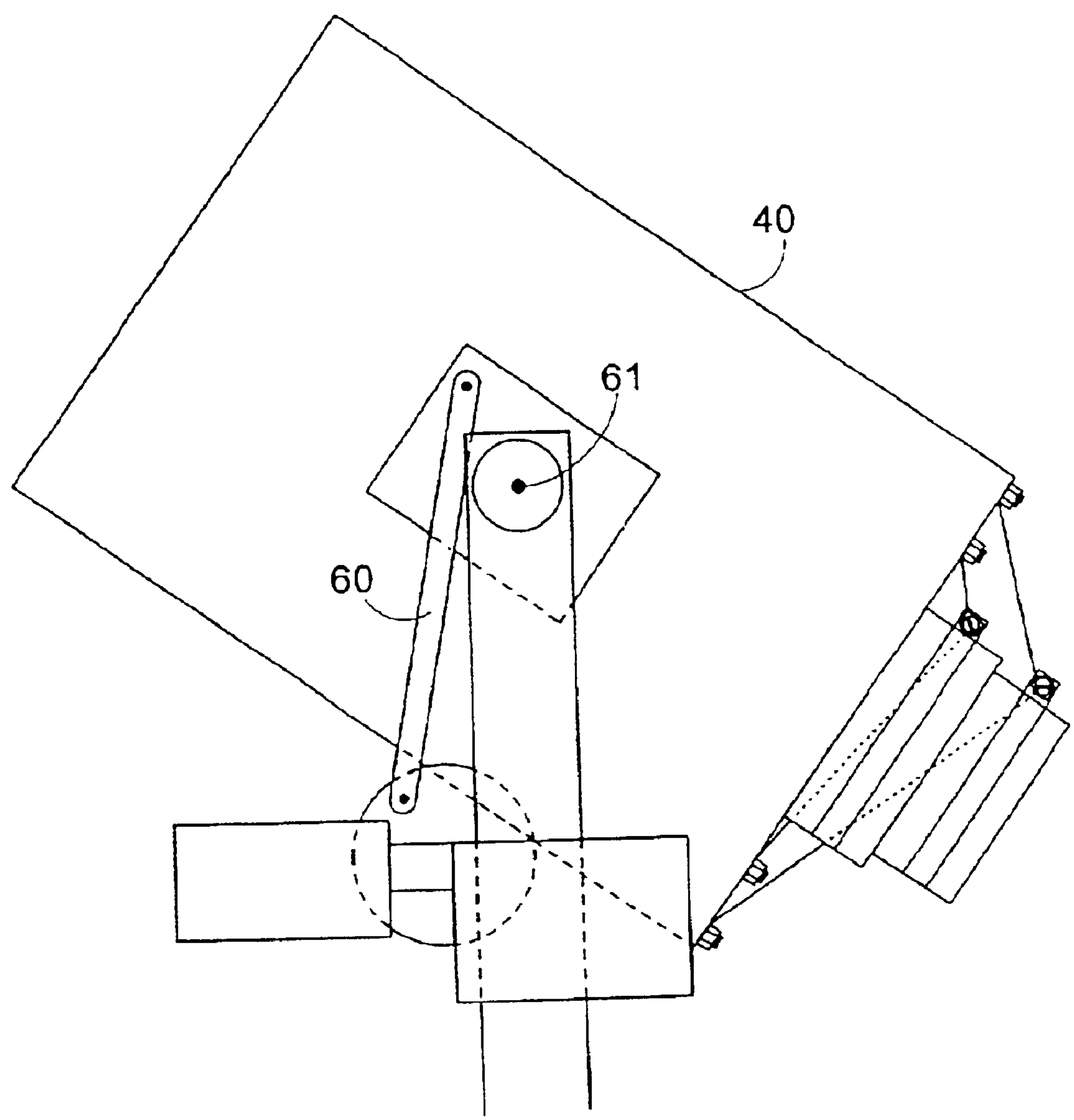

FIGS. 6 and 7 illustrate furnace 40 equipped with a rocking mechanism 60 that causes the tube furnace to move rhythmically. As shown, rocking mechanism 60 causes furnace 40 to pivot about the mid-point 61 of the longitudinal axis of furnace 40. Rocking mechanism 60 may be controlled by a variable speed controller (not shown). Furnace 40 is preferably moved from an 'up' position (FIG. 6) to a 'down' position (FIG. 7) and back to the 'up' position once every four seconds or so while mixing to ensure complete and homogeneous softening and mixing of the contents of ampoule 2. Furnace 40 preferably rocks through an angle of about 60° to 80°.

After the contents of ampoule 2 are mixed into a homogenous molten mixture, the temperature of furnace 40 is brought down to preferably within about 20° C. of the softening temperature of the glass or glass compound being synthesized, but no lower than the softening temperature. The temperature of furnace 40 is brought down at a rate of preferably about 20° C./minute. For a synthesis of about 400 grams, the temperature is held within about 20° C. of the softening temperature but no lower than the softening temperature for about ten minutes. This temperature may be, for example, between 300° C. and 320° C.

Generally, the larger the synthesis, the longer the temperature should be held within about 20° C. of the softening temperature but no lower than the softening temperature. For a synthesis of about 750 grams, the temperature should be held within about 20° C. of the softening temperature but no lower than the softening temperature for about 10 minutes. Generally, the larger the diameter of the ampoule, the longer the temperature should be held. This preferably ensures that the glass or glass compound at the center of the ampoule cools to the same temperature as the rest of the ampoule and that the glass or glass compound quenches homogeneously. Glass and glass compounds that have high amounts (e.g., more than about 30%) of germanium are preferably cooled longer than glass and glass compounds that have low amounts of germanium.

The rocking movement of furnace 40 may be stopped prior to or after furnace 40 has been at the decreased temperature. Preferably, the rocking movement is not stopped until the temperature of furnace 40 is at the decreased temperature.

Figure 8:
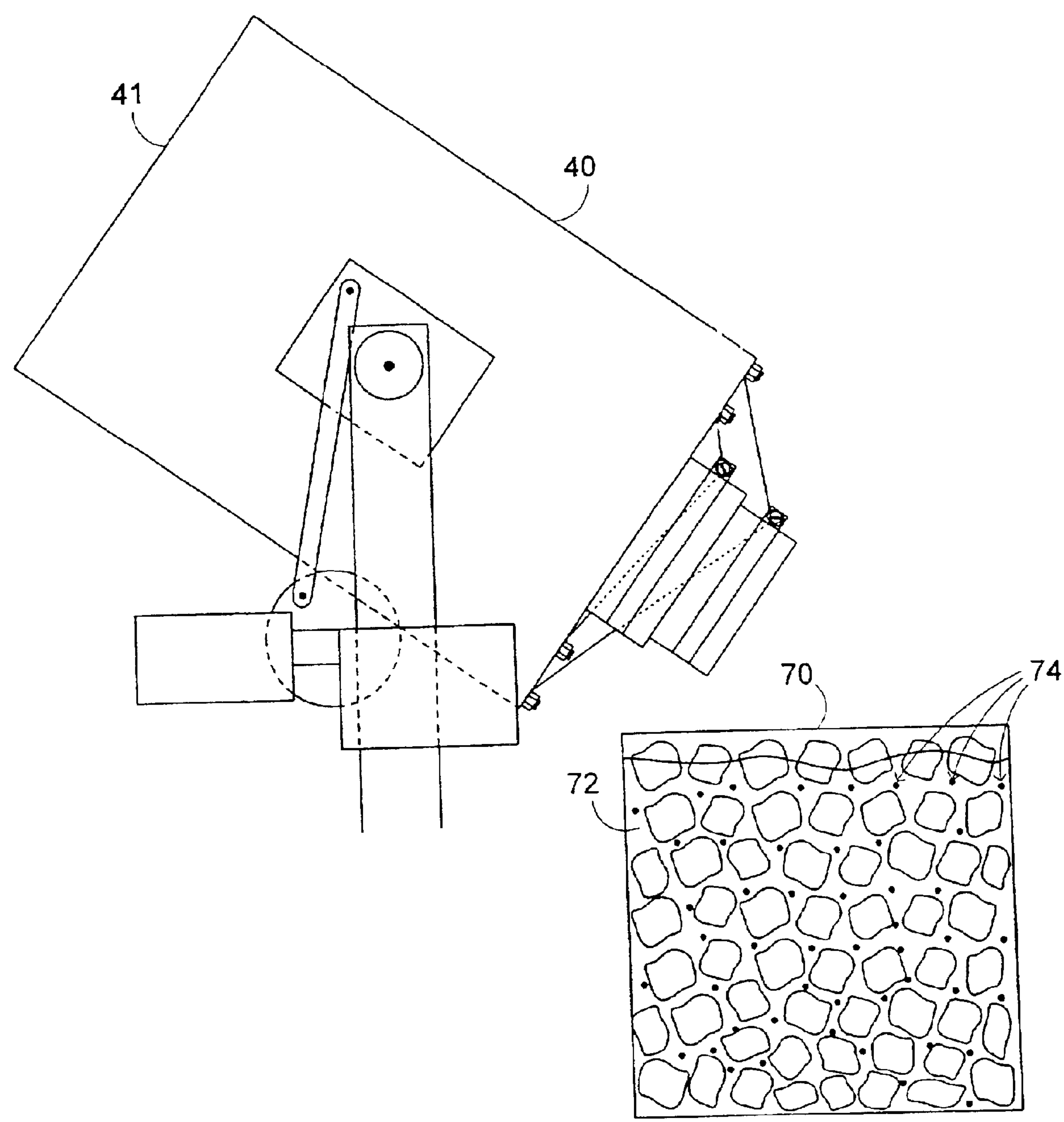
FIG. 8 illustrates the tube furnace of FIG. 4 positioned to allow the ampoule inside to slide into a quenching bath in accordance with the invention.

After ampoule 2 has been held at the decreased temperature, it is preferably left in the 'down' position as shown in FIGS. 7 and 8 for several minutes. This allows the viscous melt to collect at the bottom of ampoule 2. If this does not occur, a thin film of germanium selenide glass of slightly different stoichiometry may solidify on top of the glass being synthesized (if a glass were being synthesized). Some excess selenium may condense out of this thin film. This is undesirable because the overall stoichiometry of the glass may change. For the synthesis of a glass compound, a thin film with a different stoichiometry than the rest of the compound may solidify on top of the compound. Similarly, some excess selenium or the variable may condense out of this thin film. Unless accounted for, such condensations are undesirable.

Ampoule 2 is now quenched. FIG. 7 shows furnace 40 positioned such that the opening of furnace 40 through which ampoule 2 and assembly 12 were placed is aligned with a tub 70 filled with ice water 72. A cooling agent such as salt 74 may be placed in ice water 72 to further lower the temperature of ice water 72. Salt 74 may be, for example, calcium chloride. To remove ampoule 2, wires 50 are cut or unwrapped from screws 52. Alternatively, screws 52 may be loosened. Tube 20 may then be removed. After tube 20 is removed, ampoule 2 may slide out of furnace 40 into tub 70 on its own. If ampoule 2 does not slide out of furnace 40 by itself, end 41 of furnace 40 may be tapped. If ampoule 2 still does not slide out or if it gets stuck at the end of tube 14, metal tongs may be used to pull ampoule 2 out. Sliding ampoule 2 out of furnace 40 and into tub 70 should preferably take less than five seconds.

Metal tongs may be used to hold onto ampoule 2 while swirling it around tub 70. This more rapidly quenches ampoule 2.

Figure 9:
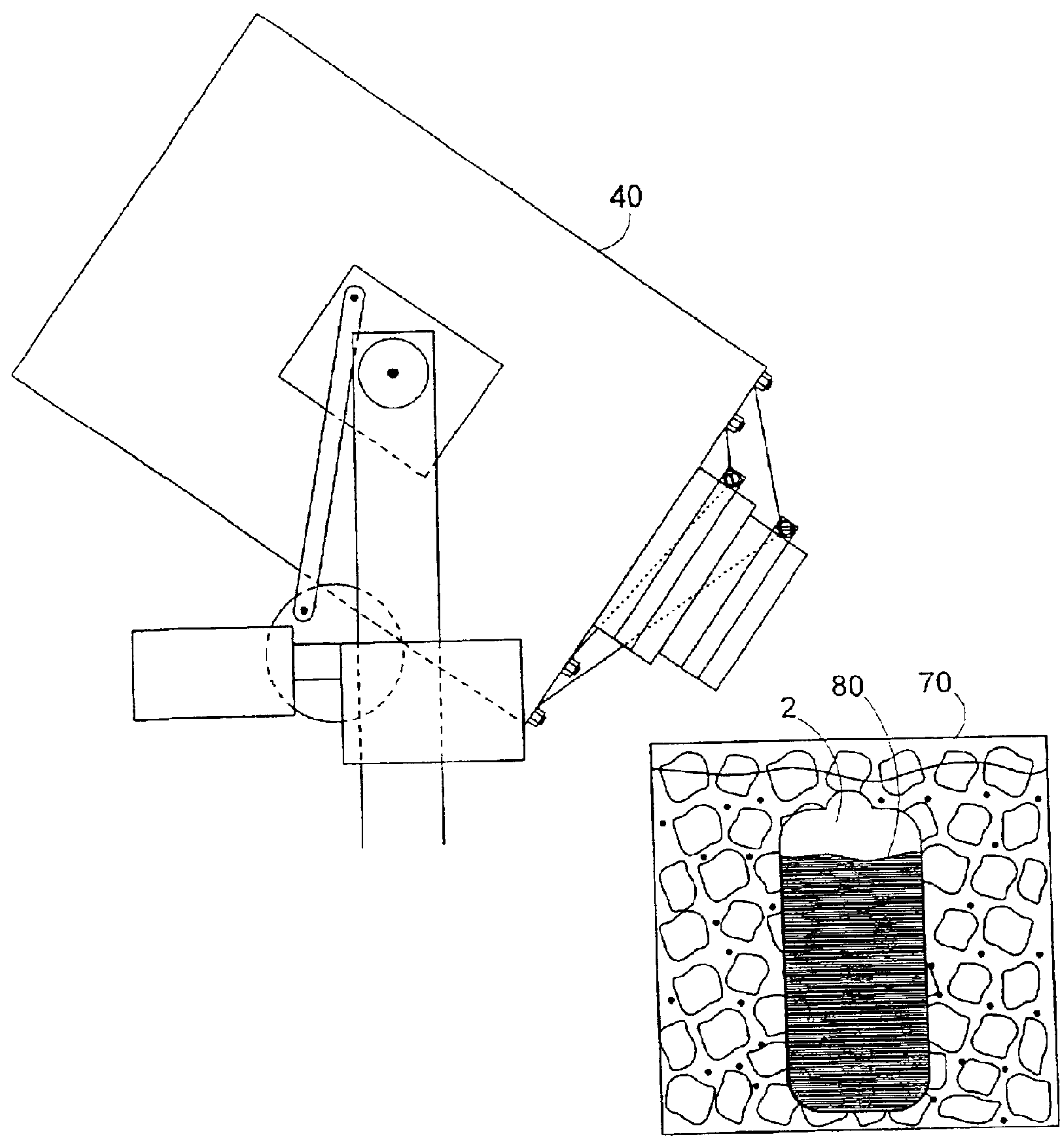
FIG. 9 illustrates the ampoule being quenched in ice water after exiting the tube furnace in accordance with the invention.

FIG. 9 illustrates ampoule 2 in tub 70. Upon quenching, the contents of ampoule 2 solidify into a germanium selenide glass or glass compound 80. The amount of time required in tub 70 depends on the size of ampoule 2 and the amount of glass or glass compound inside. For about a 20 cm. long ampoule with about a diameter of 4.6 cm., initially filled with about 50 grams of germanium and about 218 grams of selenium, ampoule 2 should be quenched in ice water for about ten minutes to ensure complete and homogeneous cooling.

Glass or glass compound 80 may be stored in ampoule 2 until needed. To retrieve glass or glass compound 80 from ampoule 2, a tungsten-carbide knife may be used to score the outer surface of ampoule 2 (e.g., by scoring completely around the circumference of ampoule 2). Ampoule 2 may then be cracked open by carefully placing the tip of a fine screwdriver, for example, on the score and gently tapping the butt of the screwdriver. In most circumstances, glass or glass compound 80 will come loose from the walls of ampoule 2. If, however, glass or glass compound 80 does not come loose, the outer walls of ampoule 2 may be gently tapped with an object like a pair of tweezers. If glass or glass compound 80 still does not come loose, the portion of ampoule 2 with glass or glass compound 80 still stuck to the walls may be immersed in a Dewar filled with $N_{2(liquid)}$. Glass or glass compound 80 will then crack, contract, and separate from the quartz-glass walls of ampoule 2. Care should be taken when choosing $N_{2(liquid)}$ or when a variable with properties that may cause the compound to act adversely to such an immersion is present in the glass compound.

Figure 10:
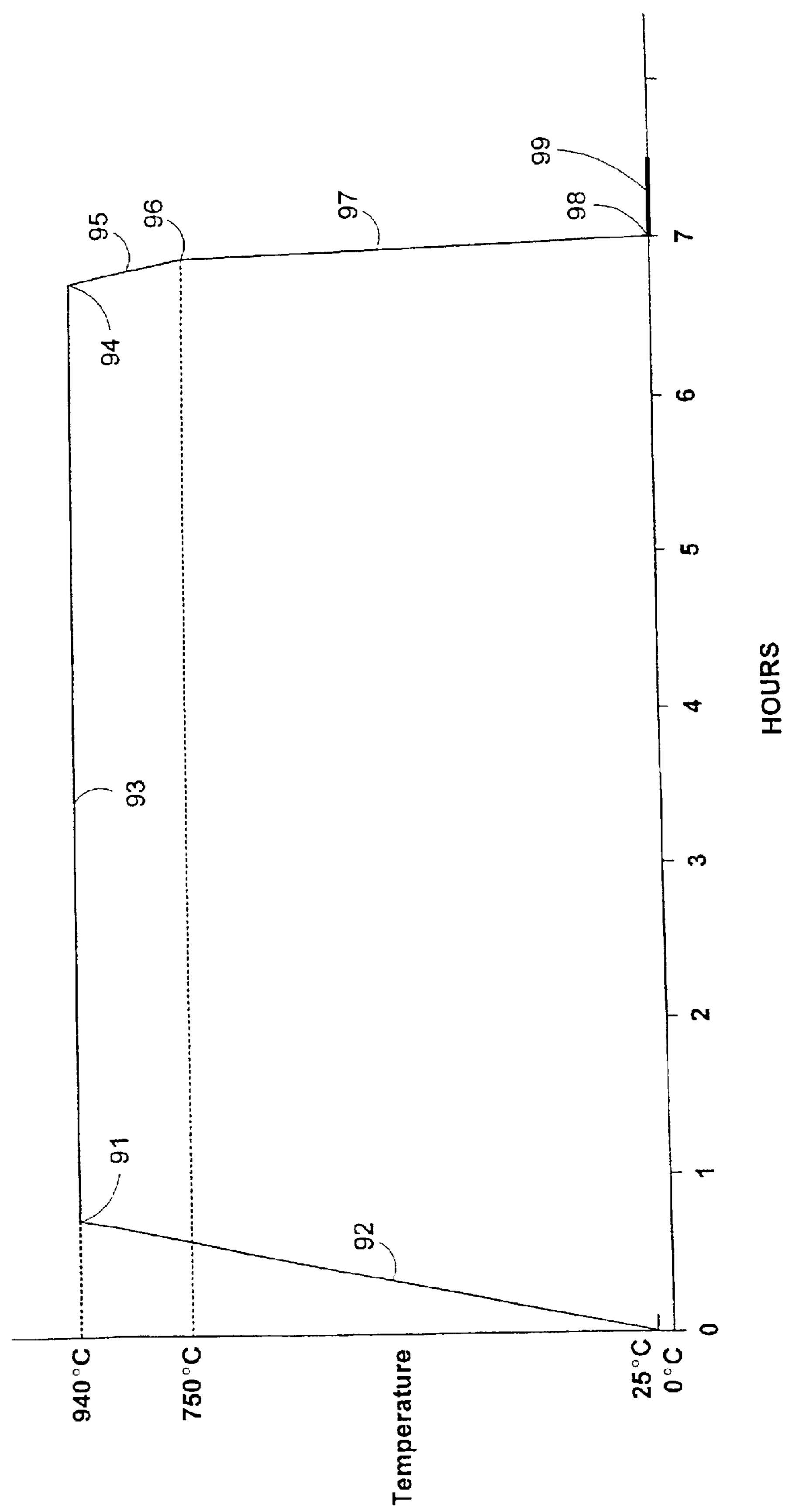
FIG. 10 is a graph of time versus temperature for large scale synthesis of a germanium selenide glass or glass compound in accordance with the invention.

FIG. 10 shows time versus temperature for the large scale synthesis of a germanium selenide glass or glass compound in accordance with the invention. An ampoule containing germanium and selenium is heated from, for example, about room temperature (at a time 0) to a temperature equal to or greater than the softening temperature of the glass or glass compound being synthesized (e.g., 940° C.), shown at point 91. The temperature of the glass or glass compound is preferably increased at a rate of about 30° C./minute. This is represented by slope 92.

After reaching point 91, the germanium, selenium, and variable (if present) are mixed at a constant temperature until the selenium, germanium, and variable completely mix and become evenly distributed inside the ampoule. This occurs during time period 93 which may be, for example, about five to about six hours, depending on the amounts of germanium, selenium, and variable involved.

After reaching point 94, (i.e., the point at which the germanium, selenium, and variable are heated and mixed), the mixture is cooled. The temperature of the mixture is preferably decreased at a rate of about 20° C./minute, represented by slope 95. The temperature of the mixture is cooled down to within about 20° C. the softening temperature but no less than the softening temperature of the glass or glass compound being synthesized (e.g., $Ge_3Se_7$). This is shown at point 96. If point 94 is within about 20° C. of the softening temperature but no lower than the softening temperature, the cooling may be unnecessary.

After the mixture reaches this range (e.g., within about 20° C. of the softening temperature but no lower than the softening temperature), the mixture is quenched. This is represented by slope 97. The time between points 96 and 98 is preferably no more than about five seconds (depending on the amount of glass or glass compound being synthesized).

Ampoule 2 is held at the quenching temperature (e.g., about 0° C.) for time period 99 to ensure complete and homogeneous cooling. Time period 99 may be, for example, about fifteen minutes to about twenty minutes for a glass or glass compound of about 400 grams.

Figure 11:
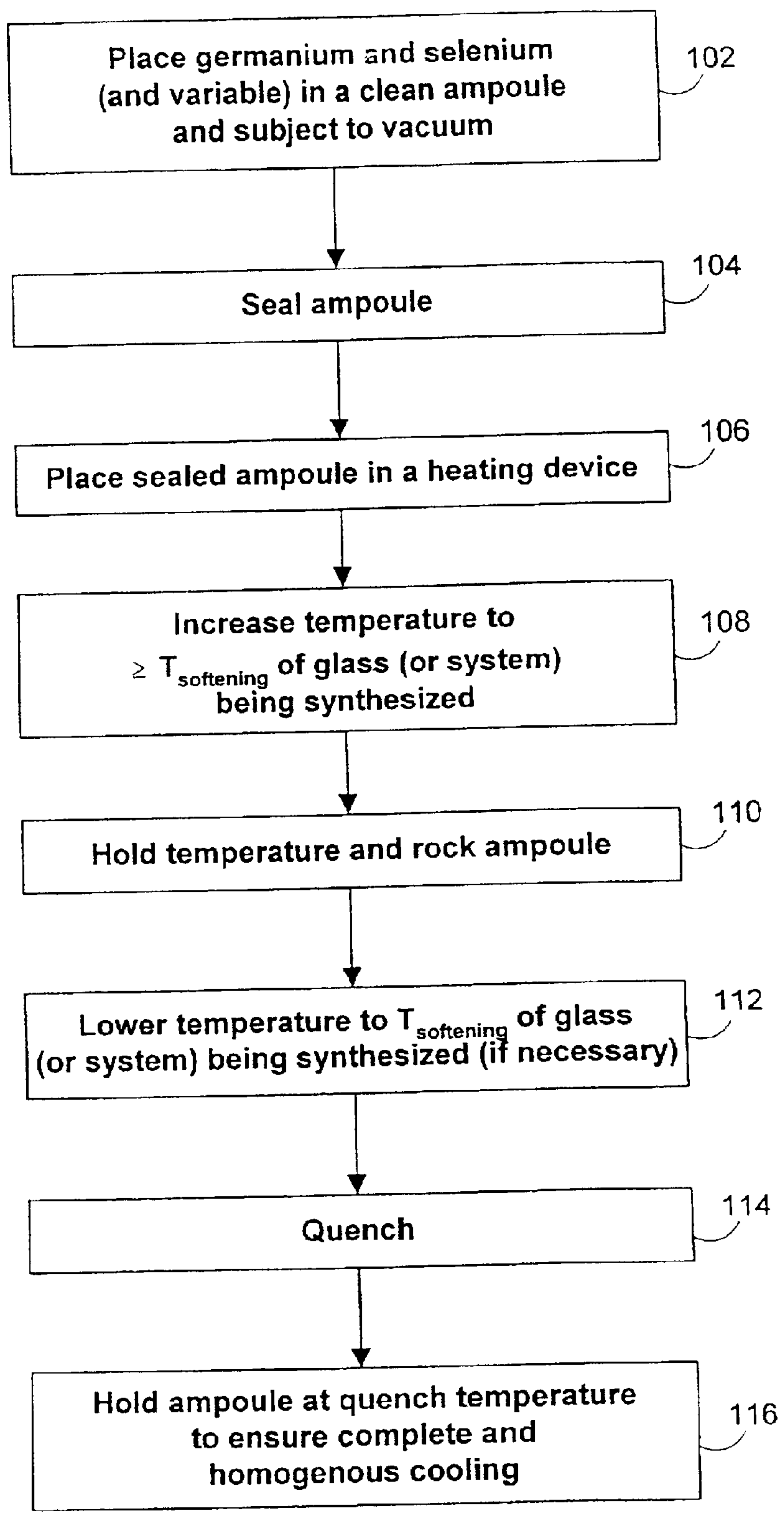
FIG. 11 is a flow chart of an embodiment of large scale synthesis of a germanium selenide glass or glass compound in accordance with the invention.

FIG. 11 shows a process for large scale synthesis of a germanium selenide glass and a germanium selenide glass compound in accordance with the invention. At step 102, germanium and selenium (and, if desired, a variable) are placed in a clean ampoule and then subjected to a vacuum. The amount of germanium placed in the ampoule is preferably stoichiometrically proportional to the amount of selenium for the particular glass being synthesized. If a variable is placed in the ampoule, the amount of the variable is preferably stoichiometrically proportional to the amount of germanium and selenium for the glass compound being synthesized. At step 104, the ampoule is sealed. At step 106, the sealed ampoule is placed in a heating device (e.g., a tube furnace).

At step 108, the temperature of the heating device is increased to the softening temperature of the glass or glass compound being synthesized or above. The temperature of the heating device is preferably increased at a rate between about 20° C./minute and about 30° C./minute. At step 110, the temperature of the heating device is held constant and the contents of the ampoule are mixed for about 5 to about 6 hours for a 400 gram glass synthesis to ensure that the germanium mixes with the selenium.

At step 112, the temperature of the heating device is lowered to within about 20° C. of the softening temperature of the glass being synthesized (e.g., $Ge_3Se_7$ or $Ge_2Se_8$) or the glass compound being synthesized (e.g., $Ge_{25}Se_{75}$; 3% atomic weight of manganese), but no lower than the softening temperature. The temperature of the heating device is preferably lowered at a rate of about 20° C./minute. If the temperature of the heating device is already within about 20° C. of the softening temperature but no lower than the softening temperature, step 112 may be unnecessary.

At step 114, the ampoule is quenched. Ampoule 2 is held at the quenching temperature (e.g., for about fifteen to about twenty minutes for a 300–400 gram synthesis or for about thirty minutes for a 750 gram synthesis) to ensure complete and homogeneous cooling. This occurs at step 116.

Note that the embodiments described in connection with FIGS. 1–11 are merely illustrative. Germanium and selenium alone or germanium, selenium, and a variable may be placed in any clean suitable equipment (i.e., equipment as free from impurities as possible), heated in any suitable heating device, mixed in any suitable way, cooled in any suitable way, and quenched in any suitable way. For example, germanium and selenium may be subjected to a vacuum and sealed in a container that has a mixing device (e.g., a stirrer) to mix the germanium and selenium.

Thus, systems and methods for large scale synthesis of germanium selenide glass and germanium selenide glass compounds are provided. One skilled in the art will appreciate that the invention can be practiced by other than the described embodiments, which are presented for purposes of illustration and not of limitation, and the invention is limited only by the claims which follow.

What is claimed is:

1. A method of synthesizing a germanium selenide glass compound comprising:

placing more than a total of about eleven grams of germanium, selenium, and a variable in a container;

increasing the temperature of said container to at least the softening temperature of said glass compound being synthesized;

holding the temperature of said container at no lower than said softening temperature;

rocking said container until said selenium, said germanium, and said variable have completely softened and mixed;

decreasing the temperature of said container to no less than the softening temperature of said glass compound being synthesized;

quenching said container; and performing said increasing, holding, rocking, and decreasing in about eight hours or less.

2. The method of claim 1 wherein said variable is selected from the group consisting of lithium, vanadium, chromium, manganese, cobalt, molybdenum, ruthenium, silver, praseodymium, neodymium, iridium, gold, and lead.

3. The method of claim 1 wherein said placing comprises placing more than a total of about eleven grams of substantially stoichiometrically proportional amounts of germanium, selenium, and a variable in said container in accordance with said germanium selenide glass compound to be synthesized.

4. The method of claim 1 further comprising sealing said germanium, selenium, and said variable under vacuum in said container.

5. The method of claim 4 wherein said container is an ampoule.

6. The method of claim 1 wherein said increasing the temperature comprises:

placing said container in a furnace; and increasing the temperature of said furnace at a rate of about 30° C./minute.

7. The method of claim 1 wherein said decreasing the temperature comprises decreasing the temperature to within about 20° C. of said softening temperature of said glass compound but no lower than said softening temperature of said glass compound.

8. The method of claim 1 wherein said quenching comprises quenching said container in ice water.

9. The method of claim 8 wherein said ice water comprises a salt.

10. A method of synthesizing a germanium selenide glass compound comprising:

placing germanium, selenium, and a variable in a container;

increasing the temperature of said container to at least the softening temperature of said glass compound continuously without stopping for a substantial period of time;

holding the temperature of said container at no lower than said softening temperature;

rocking said container until said germanium, selenium, and said variable have completely softened and mixed;

decreasing the temperature of said container to no less than the softening temperature of said glass compound being synthesized;

quenching said container; and performing said increasing, holding, rocking, and decreasing in about eight hours or less.

11. The method of claim 10 wherein said variable is selected from the group consisting of lithium, vanadium, chromium, manganese, cobalt, molybdenum, ruthenium, silver, praseodymium, neodymium, iridium, gold, and lead.

12. The method of claim 10 wherein said placing comprises placing more than a total of about eleven grams of substantially stoichiometrically proportional amounts of said germanium, selenium, and said variable in said container in accordance with a germanium selenide glass compound to be synthesized.

13. The method of claim 10 further comprising sealing said germanium, selenium, and said variable under vacuum in said container.

14. The method of claim 13 wherein said container is an ampoule.

15. The method of claim 10 wherein said increasing the temperature comprises:

placing said container in a furnace; and increasing the temperature of said furnace at a rate of about 30° C./minute.

16. The method of claim 10 wherein said substantial period of time is about fifteen minutes.

17. The method of claim 10 wherein said decreasing the temperature comprises decreasing the temperature to within about 20° C. of said softening temperature of said glass compound but no lower than said softening temperature of said glass compound.

18. The method of claim 10 wherein said quenching comprises quenching said container in ice water.

19. The method of claim 18 wherein said ice water comprises a salt.

20. A method of synthesizing a germanium selenide glass compound comprising:

placing germanium, selenium, and a variable in a container;

sealing said germanium, selenium, and said variable under vacuum in said container;

increasing the temperature of said container to at least about 400° C. continuously without stopping for a substantial period of time;

holding the temperature of said container at no lower than about 400° C.;

rocking said container until said germanium, selenium, and said variable have completely softened and mixed;

decreasing the temperature of said container to between about 300° C. and about 320° C.;

quenching said container; and performing said increasing, holding, rocking, and decreasing in about eight hours or less.

21. The method of claim 20 wherein said variable is selected from the group consisting of lithium, vanadium, chromium, manganese, cobalt, molybdenum, ruthenium, silver, praseodymium, neodymium, iridium, gold, and lead.

22. The method of claim 20 wherein said increasing the temperature comprises increasing the temperature at a rate of about 20° C./minute to about 30° C./minute.

23. The method of claim 20 wherein said increasing the temperature comprises placing said container in a furnace.

24. The method of claim 20 wherein said substantial period of time is about fifteen minutes.

25. The method of claim 20 wherein said rocking said container comprises rocking said container for about five to about six hours.

26. The method of claim 20 wherein said rocking said container comprises rocking said container for at least about four hours.

27. The method of claim 20 wherein said decreasing the temperature comprises decreasing the temperature at a rate of about 20° C./minute to about 30° C./minute.

28. A method of synthesizing a germanium selenide glass comprising:

placing more than a total of about eleven grams of germanium and selenium in a container;

increasing the temperature of said container to at least the softening temperature of said glass being synthesized;

holding the temperature of said container at no lower than said softening temperature;

rocking said container until said selenium and said germanium have completely softened and mixed;

decreasing the temperature of said container to no less than the softening temperature of said glass being synthesized;

quenching said container; and performing said increasing, holding, rocking, and decreasing in about eight hours or less.

29. The method of claim 28 wherein said placing comprises placing more than a total of about eleven grams of substantially stoichiometrically proportional amounts of germanium and selenium in said container in accordance with said germanium selenide glass to be synthesized.

30. The method of claim 28 further comprising sealing said germanium and selenium under vacuum in said container.

31. The method of claim 30 wherein said container is an ampoule.

32. The method of claim 28 wherein said increasing the temperature comprises:

placing said container in a furnace; and increasing the temperature of said furnace at a rate of about 30° C./minute.

33. The method of claim 28 wherein said decreasing the temperature comprises decreasing the temperature to within about 20° C. of said softening temperature of said glass but no lower than said softening temperature of said glass.

34. The method of claim 28 wherein said quenching comprises quenching said container in ice water.

35. The method of claim 34 wherein said ice water comprises a salt.

36. A method of synthesizing a germanium selenide glass comprising:

placing germanium and selenium in a container;

increasing the temperature of said container to at least the softening temperature of said glass continuously without stopping for a substantial period of time;

holding the temperature of said container at no lower than said softening temperature;

rocking said container until said germanium and selenium have completely softened and mixed;

decreasing the temperature of said container to no less than the softening temperature of said glass being synthesized;

quenching said container; and performing said increasing, holding, rocking, and decreasing in about eight hours or less.

37. The method of claim 36 wherein said placing comprises placing more than a total of about eleven grams of substantially stoichiometrically proportional amounts of said germanium and selenium in said container in accordance with a germanium selenide glass to be synthesized.

38. The method of claim 36 further comprising sealing said germanium and selenium under vacuum in said container.

39. The method of claim 38 wherein said container is an ampoule.

40. The method of claim 36 wherein said increasing the temperature comprises:

placing said container in a furnace; and increasing the temperature of said furnace at a rate of about 30° C./minute.

41. The method of claim 36 wherein said substantial period of time is about fifteen minutes.

42. The method of claim 36 wherein said decreasing the temperature comprises decreasing the temperature to within about 20° C. of said softening temperature of said glass but no lower than said softening temperature of said glass.

43. The method of claim 36 wherein said quenching comprises quenching said container in ice water.

44. The method of claim 43 wherein said ice water comprises a salt.

45. A method of synthesizing a germanium selenide glass comprising:

placing germanium and selenium in a container;

sealing said germanium and selenium under vacuum in said container;

increasing the temperature of said container to at least about 400° C. continuously without stopping for a substantial period of time;

holding the temperature of said container at no lower than about 400° C.;

rocking said container until said germanium and selenium have completely softened and mixed;

decreasing the temperature of said container to between about 300° C. and about 320° C.;

quenching said container; and performing said increasing, holding, rocking, and decreasing in about eight hours or less.

46. The method of claim 45 wherein said increasing the temperature comprises increasing the temperature at a rate of about 20° C./minute to about 30° C./minute.

47. The method of claim 45 wherein said increasing the temperature comprises placing said container in a furnace.

48. The method of claim 45 wherein said substantial period of time is about fifteen minutes.

49. The method of claim 45 wherein said rocking said container comprises rocking said container for about five to about six hours.

50. The method of claim 45 wherein said rocking said container comprises rocking said container for at least about four hours.

51. The method of claim 45 wherein said decreasing the temperature comprises decreasing the temperature at a rate of about 20° C./minute to about 30° C./minute.

52. A method of synthesizing a germanium selenide glass compound comprising:

placing germanium, selenium, and a variable in a container;

sealing said germanium, selenium, and said variable under vacuum in said container;

increasing the temperature of said container to about 400° C. continuously without stopping for a substantial period of time;

holding the temperature of said container at no lower than about 400° C.;

rocking said container until said germanium, selenium, and said variable have completely softened and mixed;

decreasing the temperature of said container to between about 300° C. and about 320° C.;

quenching said container; and performing said increasing, holding, rocking, and decreasing in about eight hours or less.

53. The method of claim 52 wherein said variable is selected from the group consisting of lithium, vanadium, chromium, manganese, cobalt, molybdenum, ruthenium, silver, praseodymium, neodymium, iridium, gold, and lead.

54. A method of synthesizing a germanium selenide glass compound comprising:

placing germanium, selenium, and a variable in a container;

sealing said germanium, selenium, and said variable under vacuum in said container;

increasing the temperature of said container to temperature within a range of about 400° C. to about 800° C. continuously without stopping for a substantial period of time;

holding the temperature of said container at no lower than about 400° C.;

rocking said container until said germanium, selenium, and said variable have completely softened and mixed;

decreasing the temperature of said container to between about 300° C. and about 320° C.;

quenching said container; and performing said increasing, holding, rocking, and decreasing in about eight hours or less.

55. The method of claim 54 wherein said variable is selected from the group consisting of lithium, vanadium, chromium, manganese, cobalt, molybdenum, ruthenium, silver, praseodymium, neodymium, iridium, gold, and lead.

56. A method of synthesizing a germanium selenide glass comprising:

placing germanium and selenium in a container;

sealing said germanium and selenium under vacuum in said container;

increasing the temperature of said container to about 400° C. continuously without stopping for a substantial period of time;

holding the temperature of said container at no lower than about 400° C.;

rocking said container until said germanium and selenium have softened and mixed;

decreasing the temperature of said container to between about 300° C. and about 320° C.;

quenching said container; and performing said increasing, holding, rocking, and decreasing in about eight hours or less.

57. A method of synthesizing a germanium selenide glass comprising:

placing germanium and selenium in a container;

sealing said germanium and selenium under vacuum in said container;

increasing the temperature of said container to temperature within a range of about 400° C. to about 800° C. continuously without stopping for a substantial period of time;

holding the temperature of said container at no lower than about 400° C.;

rocking said container until said germanium and selenium have softened and mixed;

decreasing the temperature of said container to between about 300° C. and about 320° C.

quenching said container; and performing said increasing, holding, rocking, and decreasing in about eight hours or less.

58. A method of synthesizing a germanium selenide glass compound comprising:

placing more than 100 grams of germanium, selenium, and a variable in a container;

sealing said germanium, selenium, and said variable under vacuum in said container;

increasing the temperature of said container to about 400° C. continuously without stopping for a substantial period of time;

holding the temperature of said container at no lower than about 400° C.;

rocking said container until said germanium, selenium, and said variable have completely softened and mixed;

decreasing the temperature of said container to between about 300° C. and about 320° C.;

quenching said container; and performing said increasing, holding, rocking, and decreasing in about eight hours or less.

59. A method of synthesizing a germanium selenide glass comprising:

placing more than 100 grams of germanium and selenium in a container;

sealing said germanium and selenium under vacuum in said container;

increasing the temperature of said container to about 400° C. continuously without stopping for a substantial period of time;

holding the temperature of said container at no lower than about 400° C.;

rocking said container until said germanium and selenium have softened and mixed;

decreasing the temperature of said container to between about 300° C. and about 320° C.;

quenching said container; and performing said increasing, holding, rocking, and decreasing in about eight hours or less.

60. A method of synthesizing a germanium selenide glass comprising:

placing more than 100 grams of germanium and selenium in a container;

sealing said germanium and selenium under vacuum in said container;

increasing the temperature of said container to temperature within a range of about 400° C. to about 800° C. continuously without stopping for a substantial period of time;

holding the temperature of said container at no lower than about 400° C.;

rocking said container until said germanium and selenium have softened and mixed;

decreasing the temperature of said container to between about 300° C. and about 320° C.;

quenching said container; and performing said increasing, holding, rocking, and decreasing in about eight hours or less.

61. A method of synthesizing a germanium selenide glass comprising:

placing more than 100 grams germanium and selenium in a container;

sealing said germanium and selenium under vacuum in said container;

increasing the temperature of said container to temperature within a range of about 400° C. to about 800° C. continuously without stopping for a substantial period of time;

holding the temperature of said container at no lower than about 400° C.;

rocking said container until said germanium and selenium have softened and mixed;

decreasing the temperature of said container to between about 300° C. and about 320° C.;

quenching said container; and performing said increasing, holding, rocking, and decreasing in about eight hours or less.

62. A method of synthesizing a germanium selenide glass compound comprising:

placing more than a total of about eleven grams of germanium, selenium, and a variable in a container;

increasing the temperature of said container to at least the softening temperature of said glass compound being synthesized continuously without stopping for a substantial period of time;

holding the temperature of said container at no lower than said softening temperature;

rocking said container until said selenium, said germanium, and said variable have completely softened and mixed;

decreasing the temperature of said container to no less than the softening temperature of said glass compound being synthesized;

quenching said container; and performing said increasing, holding, rocking, and decreasing in about eight hours or less.

63. The method of claim 62 wherein said variable is selected from the group consisting of lithium, vanadium, chromium, manganese, cobalt, molybdenum, ruthenium, silver, praseodymium, neodymium, iridium, gold, and lead.

64. The method of claim 62 wherein said placing comprises placing more than a total of about eleven grams of substantially stoichiometrically proportional amounts of said germanium, selenium, and said variable in said container in accordance with a germanium selenide glass compound to be synthesized.

65. The method of claim 62 further comprising sealing said germanium, selenium, and said variable under vacuum in said container.

66. A method of synthesizing a germanium selenide glass compound comprising:

placing germanium, selenium, and a variable in a container;

increasing the temperature of said container to at least the softening temperature of said glass compound continuously to no higher than about 850° C. without stopping for a substantial period of time;

holding the temperature of said container at no lower than said softening temperature;

rocking said container until said germanium, selenium, and said variable have completely softened and mixed;

decreasing the temperature of said container to no less than the softening temperature of said glass compound being synthesized;

quenching said container; and performing said increasing, holding, rocking, and decreasing in about eight hours or less.

67. A method of synthesizing a germanium selenide glass compound comprising:

placing germanium, selenium, and a variable in a container;

sealing said germanium, selenium, and said variable under vacuum in said container;

increasing the temperature of said container to at least about 400° C. but to no higher than about 850° C. continuously without stopping for a substantial period of time;

holding the temperature of said container at no lower than about 400° C.;

rocking said container until said germanium, selenium, and said variable have completely softened and mixed;

decreasing the temperature of said container to between about 300° C. and about 320° C.;

quenching said container; and performing said increasing, holding, rocking, and decreasing in about eight hours or less.

68. A method of synthesizing a germanium selenide glass comprising:

placing more than a total of about eleven grams of germanium and selenium in a container;

increasing the temperature of said container to at least the softening temperature of said glass being synthesized continuously without stopping for a substantial period of time;

holding the temperature of said container at no lower than said softening temperature;

rocking said container until said selenium and said germanium have completely softened and mixed;

decreasing the temperature of said container to no less than the softening temperature of said glass being synthesized;

quenching said container; and performing said increasing, holding, rocking, and decreasing in about eight hours or less.

69. A method of synthesizing a germanium selenide glass comprising:

placing germanium and selenium in a container;

increasing the temperature of said container to at least the softening temperature of said glass continuously to no higher than about 850° C. without stopping for a substantial period of time;

holding the temperature of said container at no lower than said softening temperature;

rocking said container until said germanium and selenium have completely softened and mixed;

decreasing the temperature of said container to no less than the softening temperature of said glass being synthesized;

quenching said container; and performing said increasing, holding, rocking, and decreasing in about eight hours or less.

70. A method of synthesizing a germanium selenide glass comprising:

placing germanium and selenium in a container;

sealing said germanium and selenium under vacuum in said container;

increasing the temperature of said container to at least about 400° C. but to no higher than about 850° C. continuously without stopping for a substantial period of time;

holding the temperature of said container at no lower than about 400° C.;

rocking said container until said germanium and selenium have completely softened and mixed;

decreasing the temperature of said container to between about 300° C. and about 320° C.;

quenching said container; and performing said increasing, holding, rocking, and decreasing in about eight hours or less.

* * * * *